United States Patent [19]
Schmidt et al.

[11] Patent Number: 5,926,127
[45] Date of Patent: Jul. 20, 1999

[54] MOTOR VEHICLE RADAR SYSTEM

[75] Inventors: Ewald Schmidt, Ludwigsburg; Juergen Zeiher; Klaus-Peter Wagner, both of Stuttgart; Bernhard Lucas, Mundelsheim; Thomas Beez, Weinsberg; Herbert Olbrich, Rutesheim, all of Germany

[73] Assignee: Robert Bosch GmbH, Stuttgart, Germany

[21] Appl. No.: 08/953,332

[22] Filed: Oct. 17, 1997

[30] Foreign Application Priority Data

Oct. 17, 1996 [DE] Germany ............... 196 42 810

[51] Int. Cl.⁶ .................................................. G01S 13/93
[52] U.S. Cl. .............................. 342/70; 342/175
[58] Field of Search ................... 342/70, 71, 72, 342/175

[56] References Cited

U.S. PATENT DOCUMENTS

| 5,313,213 | 5/1994 | Neumann et al. | 342/165 |
| 5,517,197 | 5/1996 | Algeo et al. | 342/70 |
| 5,680,139 | 10/1997 | Huguenin et al. | 342/175 |
| 5,714,947 | 2/1998 | Richardson et al. | 340/903 |
| 5,731,779 | 3/1998 | Kikuchi | 342/70 |

FOREIGN PATENT DOCUMENTS

| 5027 | 8/1901 | Austria . |
| 42 01 214 | 2/1993 | Germany . |
| 91/09323 | 6/1991 | WIPO . |

*Primary Examiner*—John B. Sotomayor
*Attorney, Agent, or Firm*—Kenyon & Kenyon

[57] ABSTRACT

A motor vehicle radar system in which the position of the transmission/reception elements of the radar system can be changed relative to a focusing element, such as an antenna lens, in order to adjust the principal beam direction.

7 Claims, 4 Drawing Sheets

MOTOR VEHICLE RADAR SYSTEM

FIELD OF THE INVENTION

The present invention relates a radar system, and in particular to a motor vehicle radar system.

BACKGROUND INFORMATION

Radar systems are used to detect objects, and to determine distances, directions, and/or velocities. In motor vehicles, radar systems are used, for example, for spacing, collision warning, and in automatic speed control systems. A basic characteristic common to all of these applications is that the radar system, or more precisely its directional antenna, must be precisely adjusted to a desired principal beam direction. In the case of the a motor vehicle application, the principal beam direction is often selected to be, for example, parallel to the travel axis of the vehicle. Because of installation and manufacturing tolerances or, for example, after an accident, adjustment must specifically be possible even when the radar system is installed in a mount provided on the motor vehicle.

One possibility for achieving this object is to provide a mount for the radar system, or at least its directional antenna, which is modeled on a motor vehicle headlight suspension or mounting system. In this solution, the radar system or its directional antenna is attached at three points lying in a plane perpendicular to the principal beam direction, preferably in an L-shaped configuration with respect to one another. The two outer suspension points are thus offset in two directions with respect to one another. The two outer points each consist of a threaded rod equipped at one end with a ball head, the ball head allowing the threaded rod to move in a mount. The third, center, suspension point is also movably mounted by means of a ball head. However, this third suspension point generally does not have displacement capability in the form of a threaded rod or the like. Thus, when the radar system or its directional antenna is moved at one of the two-outer threaded rods, its principal beam direction tilts about an axis that is formed by the respective other two suspension points. The principal beam direction of the radar system can thus be adjusted, at two displacement screws or two threaded rods, in two directions (preferably horizontally and vertically) located perpendicular to one another.

It is characteristic of this solution that the adjustment apparatus be combined with the mechanical suspension of the radar system or its directional antenna. Accordingly, the adjustment apparatus must in each case be re-adapted to different installation environments, particularly in the case of a physically small radar system housed in its entirety in a housing, as is used predominantly in a motor vehicle. These different installation environments result, for example, if one and the same radar system is to be installed in different motor vehicle models. In some circumstances, not only the mechanical suspension system, but also the adjustment mechanism must be redesigned in each case. This means a considerable outlay for adapting an existing radar system to other vehicle models. Moreover an external adjustment apparatus of this kind, i.e., one located outside the compact housing, requires additional space for installation in a motor vehicle.

SUMMARY OF THE INVENTION

An object of the present invention is to provide a radar system whose adjustment apparatus is implemented in simple and space-saving fashion, and which is independent of different installation environments. Because of the strict accuracy requirements of many applications, the radar system must also be precisely adjustable.

In accordance with the present invention, this object is achieved by providing a system in which the principal beam direction is adjusted by changing the position of the transmission and/or reception elements relative to their focusing means, rather than changing the position of the entire directional antenna. In an exemplary embodiment of the present invention, the focusing means of the directional antenna is immovably joined to a housing of the radar system. The transmission/reception elements of the directional antenna are mounted on a baseplate that is movably positioned inside the housing. In illustrative terms, adjustment of the principal beam direction thus takes place inside an immovable housing of the radar system.

An advantage of the radar system according to the present invention is that the adjustment mechanism is thus independent of different installation environments. Furthermore it requires no additional room for installation of the radar system in, for example, a motor vehicle. A further advantage results if the radar system is installed, for example, in the front of a vehicle. With the adjustment mechanism known hitherto, a movement of the directional antenna or of the entire radar system might cause edges to project from the front of the vehicle. Projecting edges of this kind can be eliminated by the radar system according to the present invention, because neither the radar system nor its directional antenna is moved after installation.

According to one feature of the exemplary embodiment of the present invention, the adjustment mechanism is accessible directly from the front, i.e., adjustment can be accomplished from the side at which the radar beams enter and emerge.

According to a further feature of the exemplary embodiment of the present invention, displacement of the transmission/reception elements takes place along a spherical concavity. As a result, uniform aperture occupancy for the entire antenna is retained despite the displacement.

In particularly advantageous fashion, the radar system can be adjusted not only horizontally and vertically but also in terms of rotation. This is necessary, in particular, in the case of a multiple-beam radar system, i.e., a radar system having a plurality of transmission and/or reception lobes located next to one another.

BRIEF DESCRIPTION OF THE DRAWINGS

FIG. 4b illustrates a first longitudinal section of FIG. 4a.

FIG. 4c illustrates a second longitudinal section of FIG. 4a.

DETAILED DESCRIPTION

Figure 1A:
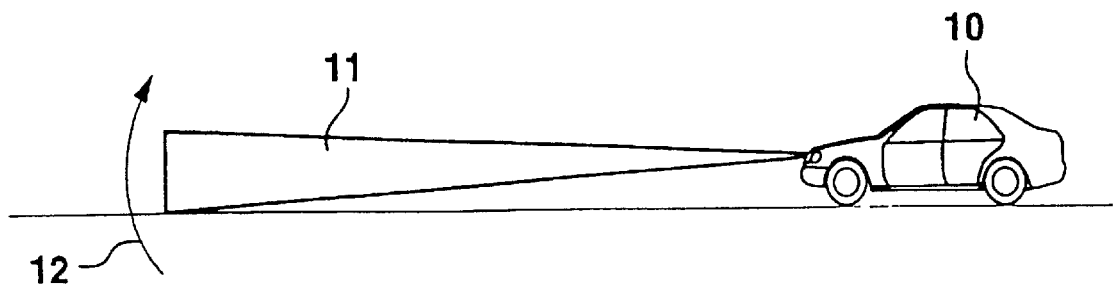
FIG. 1a shows a side view of a motor vehicle, and adjustment possibilities for a three-beam radar system installed thereon.
Figure 1B:
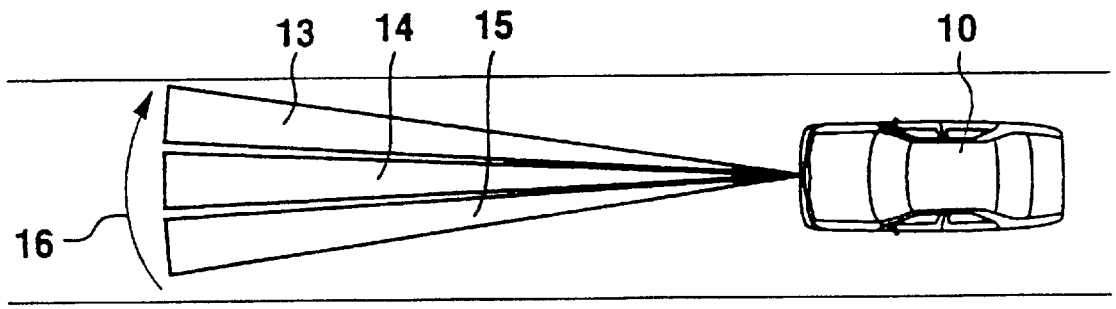
FIG. 1b shows a top view of a motor vehicle, and adjustment possibilities for a three-beam radar system installed thereon.
Figure 1C:
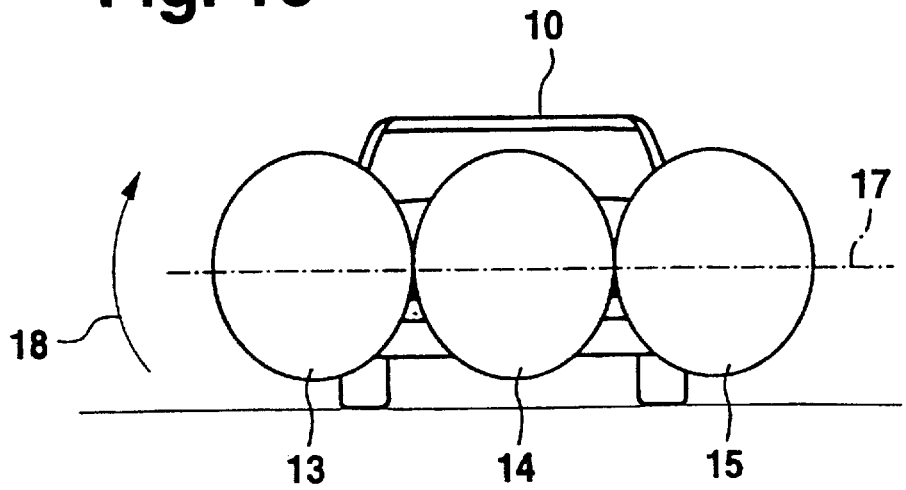
FIG. 1c shows a front view of a motor vehicle, and adjustment possibilities for a three-beam radar system installed thereon.

FIGS. 1a, 1b and 1c show three possible directions for adjustment of a radar system. FIG. 1a shows, from the side, a motor vehicle 10 from whose front a triangular region 11 proceeds. It symbolizes the propagation cone, i.e., the antenna lobe, of the radar system. An arrow 12 shows the direction of a vertical adjustment of the principal beam direction of the system.

FIG. 1b shows motor vehicle 10 in a plan view. A three-beam radar system, the three antenna lobes 13, 14, and 15 of which again proceed from the front of the vehicle, is shown here as an example. An arrow 16 indicates the horizontal adjustment direction. FIG. 1c shows a front view of motor vehicle 10. A third adjustment direction that results from the multiple-beam radar system is illustrated. The three antenna lobes 13, 14, and 15 lie next to one another along an axis 17. In order to compensate for rotation of the radar system, adjustment of horizontal axis 17 must be performed in the rotation direction of arrow 18. These three figures (i.e., FIGS. 1a, 1b, and 1c) show all the essential adjustment possibilities for a multiple-beam radar system.

Figure 2A:
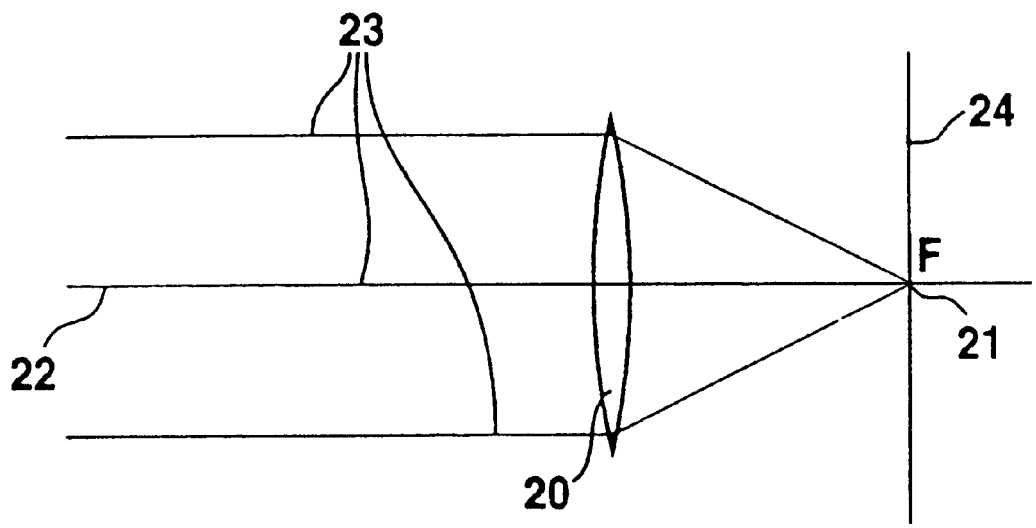
FIG. 2a shows a first beam path of electromagnetic waves through a focusing means.
Figure 2B:
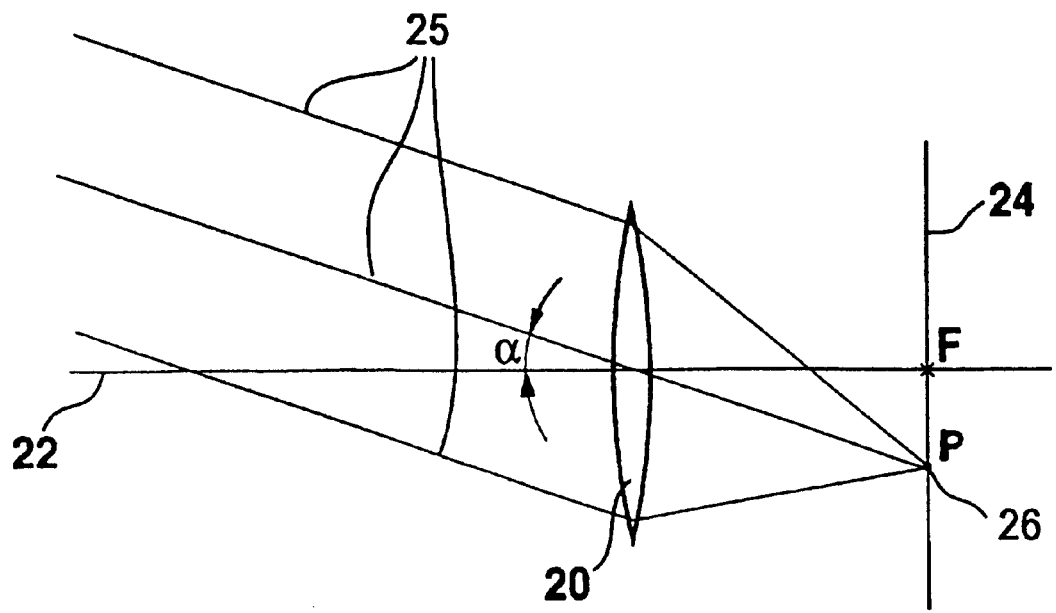
FIG. 2b shows a second beam path of electromagnetic waves through a focusing means.

FIGS. 2a and 2b show a focusing means, and two possible beam paths for electromagnetic waves. In accordance with an exemplary embodiment of the present invention, the focusing means is a dielectric lens. In FIG. 2a, a transmission/reception element (not shown) is located at focal point F of dielectric lens 20. On the side of the lens opposite focal point F, electromagnetic rays 23 propagate parallel to optical axis 22 of lens 20.

In FIG. 2b, a transmission/reception element (not shown) is located at a point P which lies in the focal plane 24 of lens 20 but is not identical to focal point F of the lens. The beam path of electromagnetic waves 25 focused at this point P now no longer extends parallel to optical axis 22, but is inclined with respect thereto at an angle α.

The adjustment principle underlying the present invention is shown with reference to these two illustrations. A displacement of a transmission/reception element along the focal plane of a focusing means generates an inclination of the beam path with no movement of the focusing means itself.

Figure 3A:
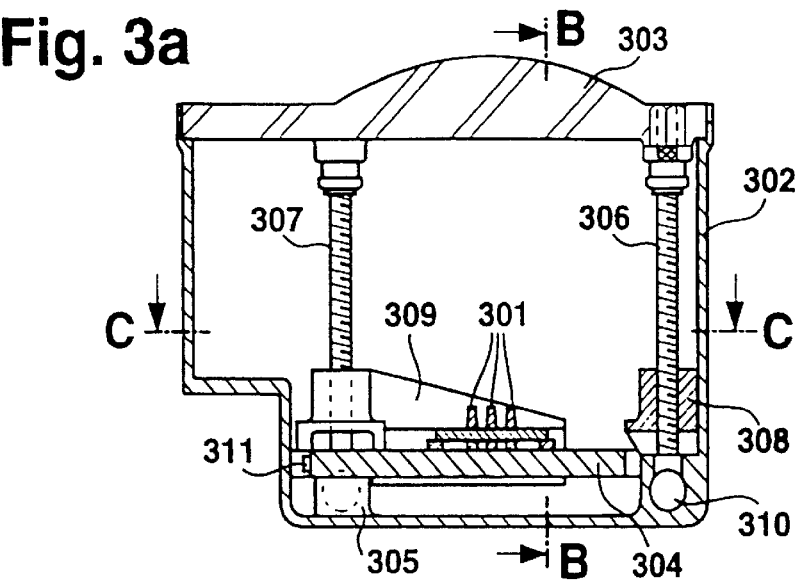
FIG. 3a shows a cross section of a radar system according to a first exemplary embodiment of the present invention.
Figure 3B:
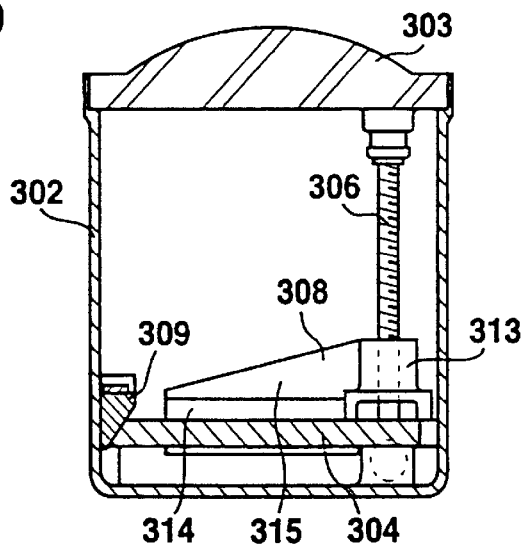
FIG. 3b shows a cross-sectional view (taken along line B—B of FIG. 3a) of the first exemplary embodiment of the radar system according to the present invention.
Figure 3C:
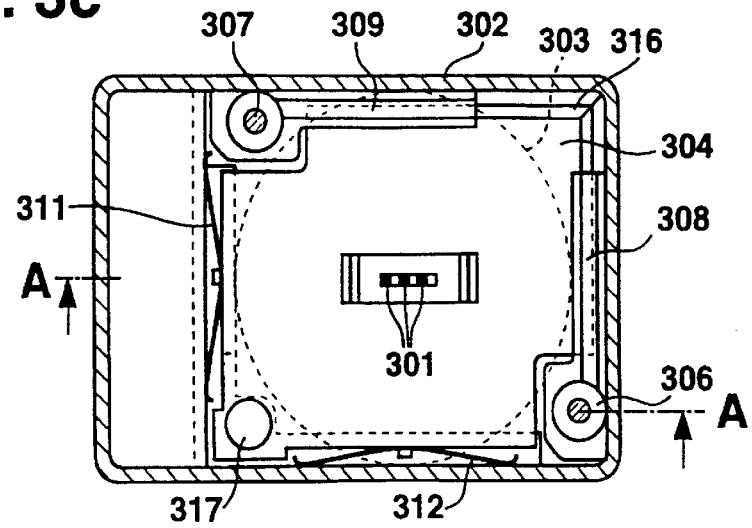
FIG. 3c shows a cross-sectional view (taken along line C—C of FIG. 3a) of the first exemplary embodiment of the radar system according to the present invention.

FIGS. 3a, 3b and 3c illustrate a first exemplary embodiment of the radar system of the present invention.

FIG. 3a shows the cross section of a radar system according to the present invention. Three transmission/reception elements in the form of a microwave integrated circuit (MIC) 301 are located inside a housing 302. In the beam direction of the transmission/reception elements, housing 302 is closed off by a dielectric lens 303. This on the one hand serves as a window and protects MIC 301, as well as further components, from soiling and other environmental influences. In addition, it constitutes the focusing element of the directional antenna made up of MIC 301 and lens 303. MIC 301 is installed on a baseplate 304 that is mounted movably on pedestals 305. Two threaded rods 306 and 307 extend perpendicular to baseplate 304 and inside housing 302. They are anchored at one end in housing 302 with ball heads 310. At their other ends they pass through lens element 303, but without projecting into the focusing region. Two wedge-shaped sliders 308 and 309 run on threaded rods 306, 307. As is even more clearly evident from FIG. 3c, the two 5 threaded rods 306 and 307 are located at diagonally opposite corners of baseplate 304. The two wedge-shaped sliders 308, 309 extend along two non-opposite edges of baseplate 304. Based on this arrangement, each of the two wedge-shaped sliders 308, 309 constitutes a guide rail for a shift of baseplate 304 that results from a displacement of the respective other wedge-shaped slider and that accordingly occurs parallel to the first 10 wedge-shaped slider.

FIG. 3b shows a second cross-sectional view of the radar system according to the present invention that results from a section along line B—B in FIG. 3a. Wedge-shaped slider 308, running with its internal threads 313 on threaded rod 306, is once again visible here; 314 designates the actual wedge which runs along baseplate 304. An almost triangular surface 315 adjoining internal threads 313 serves exclusively for stabilization, and possesses no further functional significance. The tip of wedge-shaped slider 309 is visible in cross section to the left of baseplate 304.

FIG. 3c shows a third view of the radar system according to the present invention, resulting from a section along line C—C shown in FIG. 3a. In this plan view, it is evident that MIC 301 is installed almost in the center of baseplate 304. The two threaded rods 306 and 307 are located at two diagonally opposite corners of baseplate 304. The latter possesses, at the two sides against which wedge-shaped sliders 308 and 309 rest, an edge 316 which tapers in a wedge shape in the opposite direction. Installed on the third and fourth (untapered) edges of baseplate 304 are respective spring elements, in this case as leaf springs 311, 312. They generate the counterforce necessary for the two wedge-shaped sliders. A pin 317 secures baseplate 304 in housing 302.

For precise adjustment of the radar system, the two threaded rods 306 and 307 are now rotated from their accessible side. As a result, the two wedge-shaped sliders 308 and 309 move up or down. If a wedge-shaped slider is then moved increasingly in the direction of baseplate 304, it pushes baseplate 304 toward the respective opposite spring. Baseplate 304, and with it MIC 301, can thus be moved in an X and a Y direction by rotating the two threaded rods. As shown in FIG. 2, this means a displacement of the transmission/reception elements along a focal plane of focusing lens 303.

Figure 4A:
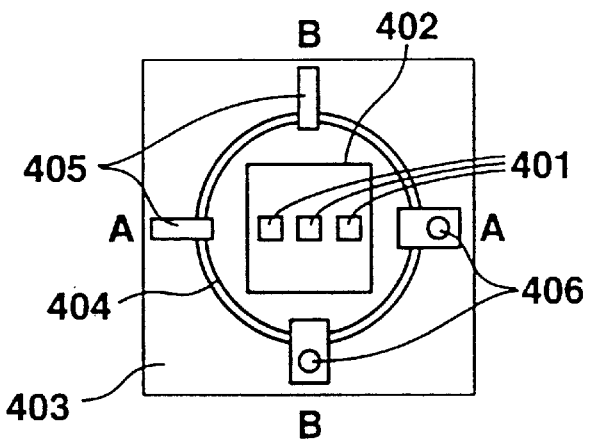
FIG. 4a shows a plan view of the transmission/reception elements of a second exemplary embodiment of the radar system of the present invention.
Figure 4B:
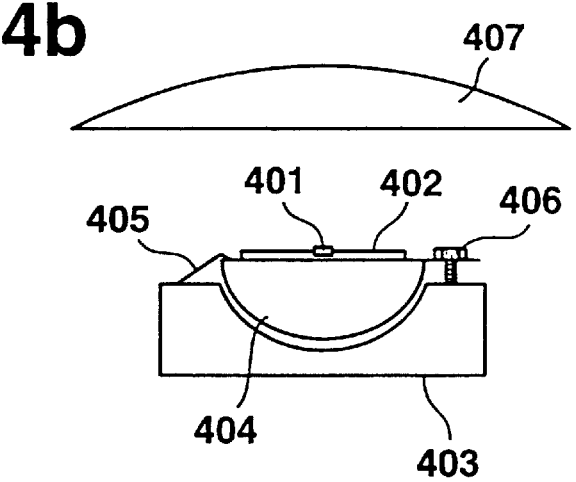
Figure 4C:
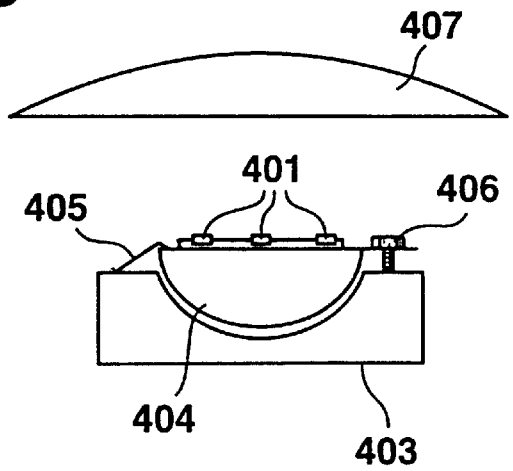

FIGS. 4a, 4b and 4c show a second exemplary embodiment of the radar system of the present invention.

FIG. 4a shows a plan view of the transmission/reception elements of the radar system. The three transmission/reception elements 401 are once again components of a MIC 402. This is installed on a movable baseplate 404 which is in turn located above a support plate 403. Two retaining springs are labeled 405, and two adjustment screws 406. Their function and interaction may be deduced from the longitudinal sections of FIGS. 4b and 4c.

FIG. 4b shows a baseplate 404, in the shape of a spherical segment, on which MIC 402 with transmission/reception elements 401 is mounted. The spherical-segment-shaped or dome-shaped underside of baseplate 404 lies in a spherical concavity of support plate 403. As a result, baseplate 404—and with it MIC 402 with transmission/reception elements 401—can be displaced in all three of the directions shown in FIG. 1. 407 indicates a focusing means which once again is preferably configured as an antenna lens. Two springs 405 and two adjustment screws 406 serve to secure the baseplate and thus the adjustment of the transmission/reception elements. Screwing adjustment screws 406 in generates a force on spherical-segment-shaped or dome-shaped baseplate 404 which is counteracted by retaining springs 405. In the interaction between these two elements 405, 406, screwing adjustment screw 406 in causes, for example, the beam direction of transmission/reception elements 401 to be inclined to the right in this Figure.

FIG. 4c shows the second exemplary embodiment in a second longitudinal section. Spherical-segment-shaped or dome-shaped baseplate 404, with transmission/reception elements 401, is once again visible. Baseplate 404 lies in the spherical concavity of support plate 403. This view again shows how adjustment and securing are performed by means of an opposing retaining spring 405 and an adjustment screw 406.

It should be noted that the present invention can, of course, be used not only for a utilization of a radar system or on a motor vehicle, but is fundamentally suitable for any radar system, or for example also any radio-link system. In general terms, the present invention can be applied to any system that, by means of at least one focusing element, generates a directed emission of waves. The present invention can also, of course, be put into practice by means of various structural embodiments.

What is claimed is:

1. A motor vehicle radar system, comprising:
   a housing;
   a baseplate mechanically moveably situated within the housing;
   at least one directional antenna including:
      at least one transmission/reception element for at least one of transmitting and receiving electromagnetic waves, the at least one transmission/reception element being mounted on the baseplate, and
      at least one focusing element focusing the electromagnetic waves and being fixedly connected to the housing; and
      at least two displacement elements, coupled to at least one of the at least one transmission/reception element and the at least one focusing element, for changing a first position of the at least one transmission/reception element relative to the at least one focusing element and for changing a second position of the baseplate relative to the at least one focusing element in at least two different directions.

2. The motor vehicle radar system according to claim 1, wherein the housing has a side through which the at least one transmission/reception element transmits and receives the electromagnetic waves, and wherein the at least two displacement elements are at least one of accessible and displaceable through the side of the housing.

3. The motor vehicle radar system according to claim 2, wherein the at least two displacement elements apply a force to the at least one transmission/reception element, the motor vehicle radar system further comprising:
   a spring element positioned to counteract the force of the at least two displacement elements.

4. The motor vehicle radar system according to claim 1, further comprising:
   at least one threaded rod mounted in the housing and extending perpendicular relative to the baseplate; and
   at least one slider movably cooperating with the at least one threaded rod and exerting a lateral force on the baseplate, the at least one slider being wedge-shaped.

5. The motor vehicle radar system according to claim 4, further comprising:
   at least one further threaded rod mounted in the housing and extending perpendicular relative to the baseplate; and
   at least one further slider movably cooperating with the at least one further threaded rod and exerting a further lateral force on the baseplate, the at least one further slider being wedge-shaped,
   wherein the baseplate has at least two lateral surfaces, one of the at least two lateral surfaces has a wedge shape at a first area for adjoining the at least one slider, and another of the at least two lateral surfaces has a wedge shape at a second area for adjoining the at least one further slider.

6. The motor vehicle radar system according to claim 5, wherein each of the at least one slider and the at least one further slider includes a guide rail for moving the baseplate parallel to each of the at least one slider and the at least one further slider.

7. The motor vehicle radar system according to claim 1, wherein the baseplate includes a base having a particular shape the baseplate being mounted to the base in a matching spherical concavity, the Particular shape being one of a spherical-segment-shape and a dome-shape.

* * * * *